United States Patent
Zhou

(10) Patent No.: US 10,287,183 B2
(45) Date of Patent: May 14, 2019

(54) ELECTROPLATING WASTEWATER TREATMENT PROCESS USING RED MUD, STRAW AND SEAWATER

(71) Applicant: HK SHENZHOU ENTERPRISE MANAGEMENT LIMITED, Hong Kong (CN)

(72) Inventor: Yanhong Zhou, Hong Kong (CN)

(73) Assignee: Shenzhen Oukeli Technology Co., Ltd., Shenzhen, Guangdong (CN)

( * ) Notice: Subject to any disclaimer, the term of this patent is extended or adjusted under 35 U.S.C. 154(b) by 91 days.

(21) Appl. No.: 15/523,924

(22) PCT Filed: Mar. 6, 2017

(86) PCT No.: PCT/CN2017/075734
§ 371 (c)(1),
(2) Date: May 2, 2017

(87) PCT Pub. No.: WO2017/152817
PCT Pub. Date: Sep. 14, 2017

(65) Prior Publication Data
US 2018/0118583 A1    May 3, 2018

(30) Foreign Application Priority Data
Mar. 10, 2016    (CN) .......................... 2016 1 0135746

(51) Int. Cl.
| | | |
|---|---|---|
| C02F 1/42 | (2006.01) |
| B01D 15/00 | (2006.01) |
| B01J 39/00 | (2006.01) |
| B09B 3/00 | (2006.01) |
| B09B 5/00 | (2006.01) |
| B09C 1/00 | (2006.01) |
| C02F 1/28 | (2006.01) |
| B01J 20/24 | (2006.01) |
| B01J 20/28 | (2006.01) |
| C02F 1/52 | (2006.01) |
| C02F 1/66 | (2006.01) |
| C02F 101/20 | (2006.01) |
| C02F 101/22 | (2006.01) |
| C02F 103/34 | (2006.01) |
| C02F 1/00 | (2006.01) |
| C02F 1/36 | (2006.01) |
| C02F 103/16 | (2006.01) |

(52) U.S. Cl.
CPC ............... *C02F 1/286* (2013.01); *B01J 20/24* (2013.01); *B01J 20/28004* (2013.01); *B01J 20/28016* (2013.01); *B09B 3/00* (2013.01); *B09B 5/00* (2013.01); *B09C 1/00* (2013.01); *C02F 1/5245* (2013.01); *C02F 1/5263* (2013.01); *C02F 1/001* (2013.01); *C02F 1/36* (2013.01); *C02F 1/66* (2013.01); *C02F 2101/20* (2013.01); *C02F 2101/22* (2013.01); *C02F 2103/16* (2013.01); *C02F 2103/34* (2013.01)

(58) Field of Classification Search
USPC ........................................................ 210/663
See application file for complete search history.

(56) References Cited

U.S. PATENT DOCUMENTS

| | | | |
|---|---|---|---|
| 2008/0179253 A1* | 7/2008 | Clark ....................... B01J 20/06 210/660 |
| 2014/0264157 A1* | 9/2014 | Kolomitsyn ......... B01J 20/3078 252/181 |

OTHER PUBLICATIONS

Tong et al. (Adsorption of Cu (II) by biochars generated from three crop straws, ChE. J., pp. 828-834, Aug. 15, 2011). (Year: 2011).*
Renkou et al. (CN102351271; Application of Straw Biomass Charcoal in Processing Electroplating Wastewater (Abstract & MT; Feb. 15, 2012; 12 pages)). (Year: 2012).*

* cited by examiner

*Primary Examiner* — Hayden Brewster

(57) ABSTRACT

An electroplating wastewater treatment method includes steps of: (A) crushing the straws into particles, stirring and mixing the crushed straw particles with the electroplating wastewater, and obtaining a mixture, wherein 40-50 g of straw particles are added into each liter of the electroplating wastewater; (B) mixing the seawater with the red mud, adjusting a pH value in a range of 8.5-9.5, filtering after standing, and obtaining a filtrate, wherein: a weight of the red mud which is added into the seawater is 200-300 g per liter seawater; (C) ultrasonically mixing the mixture in step (A) with the filtrate in step (B), standing, and then ultrasonically mixing, and then filtering after standing; and (D) adjusting a pH value of the filtrate obtained in step (C) to 7.

5 Claims, No Drawings

ELECTROPLATING WASTEWATER TREATMENT PROCESS USING RED MUD, STRAW AND SEAWATER

CROSS REFERENCE OF RELATED APPLICATION

This is a U.S. National Stage under 35 U.S.C. 371 of the International Application PCT/CN2017/075734, filed Mar. 6, 2017, which claims priority under 35 U.S.C. 119(a-d) to CN 201610135746.2, filed Mar. 10, 2017.

BACKGROUND OF THE PRESENT INVENTION

Field of Invention

The present invention relates to the field of wastewater treatment technology, and more particularly to an electroplating wastewater treatment process.

Description of Related Arts

China's economic development is inseparable from industrial support, and especially the processing industry. The electroplating industry is very important in China's processing industry. With the development of the electroplating industry, the pollution problem of electroplating wastewater is becoming more and more serious. Electroplating wastewater produced by electroplating contains a variety of heavy metal ions, if the heavy metal ions in the wastewater are directly discharged into the natural environment without being treated, it will cause immeasurable harm to the survival of people and other organisms. Therefore, the study of electroplating wastewater treatment is imperative.

There are many ways to treat heavy metal pollution wastewater. In the current electroplating wastewater treatment methods, the chemical treatment method is reliable but has disadvantages that the treatment efficiency is low, the processing depth is shallow, a large amount of chemical agents are needed, and the processing cost is extremely high. Other methods also have disadvantages of large investment, high energy consumption, operational difficulties, and easy to produce secondary pollution and other issues at varying degrees.

Red mud is an industrial solid waste discharged from bauxite after refining aluminium oxide. It generally contains a large amount of iron oxide, and is similar to the red soil in appearance, thus being named as the red mud. Generally, 1 ton of aluminium oxide is produced, and 1.0 to 2.0 tons of red mud is incidentally produced. China's annual emissions of the red mud are up to several million tons, the current red mud treatment process is more complex and has high cost, so that the red mud is unable to be fully effectively treated, and relies on a large area of the yard to pile up, thus occupying a lot of lands and causing serious pollution to the environment.

Straw is a generic term for stem and leaf parts of mature crops. More than half of the crop photosynthesis products are present in the straw, so the straw is rich in nitrogen, phosphorus, kalium, calcium, magnesium and organic matters, is a multi-purpose renewable biological resource. With the increase in agricultural production in China, along with a large amount of straw accumulation, the re-use rate of the straw is low, most of the remaining is treated through incineration, which not only causes a lot of effective resources are wasted, but also causes haze weather after straw burning, and produces a large amount of toxic and hazardous substances, thereby threatening the health of people and other creatures.

SUMMARY OF THE PRESENT INVENTION

In order to solve the above problems, the present invention provides an electroplating wastewater treatment process, which utilizes the red mud of pollutants and the rural waste straws instead of a large number of chemical agents, and is able to effectively treat the electroplating wastewater while realizing the comprehensive utilization of red mud and straws, so that one waste is utilized to treat another waste, and the process has low treatment cost and highly-efficient environmental protection.

To achieve the above object, a technical solution adopted by the present invention is as follows. An electroplating wastewater treatment method, which adopts industrial waste red mud, agricultural waste straws and seawater to treat heavy metal ions in electroplating wastewater, the method comprises steps of:

(A) mixing the straws with the electroplating wastewater, which comprises crushing the straws into particles, stirring and mixing the crushed straw particles with the electroplating wastewater for 30-50 min, and obtaining a mixture, wherein 40-50 g of straw particles are added into each liter of the electroplating wastewater; in step (A), the straw particles and the electroplating wastewater are stirred and mixed, the electroplating wastewater causes the straw particles to hydrolyze, the heavy metal ions are preliminarily adsorbed in the electroplating wastewater, a part of the heavy metal ions in the electroplating wastewater are removed; the straws are crushed and then mixed with the electroplating wastewater, which is beneficial to improve a surface area of the straws for further improving an adsorption effect;

(B) mixing the seawater with the red mud, which comprises stirring and mixing the seawater with the red mud for 20-30 min, adjusting a pH value of a mixture of the seawater and the red mud in a range of 8.5-9.5, filtering after standing for 2-3 h, and obtaining a filtrate, wherein: a weight of the red mud which is added into the seawater is 200-300 g per liter seawater; a tests shows that a pH value of the red mud is very high, a pH value of a leachate of the red mud is 12.1-13.5, the high pH value of the red mud is caused by sodium hydrosilicate containing hydrate in the red mud which contains $Na_2O$, and however, the seawater contains a large amount of $CaCl_2$, $MgSO_4$ and NaCl which are able to exchange with $Na_2O$ in the red mud for removing $Na_2O$ so as to reduce a content of $Na_2O$ below 0.8%, to reduce the pH value of the red mud, thus the red mud which is treated by the seawater meets requirements for industrial production of cement raw materials;

(C) adsorbing metal ions, which comprises ultrasonically mixing the mixture in step (A) with the filtrate in step (B) for 30-50 min, standing for 3-5 h, and then ultrasonically mixing for 20-30 min, and then filtering after standing for 1-2 h, wherein in step (C), a pH value of the filtrate is adjusted in a range of 8.5-9.5 through seawater treatment, the mixture obtained in step (A) and the filtrate obtained in step (B) are sufficiently ultrasonically mixed under alkaline conditions, a precipitate is formed after the heavy metal ions in step (A) are fully hydrolyzed under the alkaline conditions, hydroxyl and carbonyl, which are formed after the straws are hydrolyzed under the alkaline conditions in step (A), are able to more effectively absorb the metal ions, so that under the synergies of the above two mechanisms, the heavy metal ions in the electroplating wastewater are effectively removed, thereby obtaining an excellent purification effect; and (D) adjusting a pH value of a filtrate obtained in step (C) to 7.

Specifically, in step (C), a volume ratio of the mixture obtained in step (A) and the filtrate obtained in step (B) is in a range of 1:0.8-1.2.

Specifically, in step (A), the crushed straw particles have a particle size in a range of 60-100 meshes.

Specifically, in step (A), before mixing the crushed straw particles with the electroplating wastewater, the crushed straw particles are heated at 250-350° C. for 1.5-3 h in vacuum condition. In this solution, the straw particles are heated in vacuum condition to be carbonized, surfaces of the carbonized straw particles are rich in oxygen-containing functional groups, such that the carbonized straw particles have a large amount of negative charges on the surface thereof at the high pH value, and have strong adsorption capacity for heavy metal positive ions. After carbonization, the straw particles have the better adsorption effect on the heavy metal ions in the electroplating wastewater, the purification effect is stronger, and the carbonized straws are able to act as fuel to be recycled and reused. Therefore, the present invention is green and has no secondary pollution.

Specifically, the electroplating wastewater comprises chromium-containing wastewater, copper-containing wastewater, nickel-containing wastewater, cadmium-containing wastewater, zinc-containing wastewater and silver-containing wastewater.

Beneficially effects of the present invention are as follows.

1. Agricultural waste straws, industrial waste red mud and seawater are comprehensive utilized to treat the electroplating wastewater, that is, no heavy metal is discharged in the electroplating wastewater, and the treatment effect is good.

2. No construction is required and no other chemical agents are used in the process, the treatment costs are extremely low and the treated discharge standards are able to be met.

3. Treatment raw materials have wide variety of sources, and are waste to achieve waste treatment and comprehensive utilization. Furthermore, after treatment, the straws and the red mud waste are able to be recycled and reused, has no secondary pollution and environmental protection.

DETAILED DESCRIPTION OF THE
PREFERRED EMBODIMENT

The present invention is further explained with accompanying embodiments as follows.

Electroplating wastewater comes from Dongguan City Products Co., Ltd., China; through determination, concentrations of main heavy metal ions in the electroplating wastewater are obtained, wherein $Cr^{6+}$: 76 mg/L, $Cu^{2+}$: 34 mg/L, $Zn^{2+}$: 47 mg/L, $Ni^{2+}$: 30 mg/L, $Ag^+$: 22 mg/L and $Cd^{2+}$: 52 mg/L; a pH value of the electroplating wastewater is 2.5; red mud comes from a new material in Hebei Province Limited, China, a pH value of the red mud is 13.5.

The First Embodiment

Take 10 L electroplating wastewater for stand-by, crush straws into particles having a particle size of 60 meshes and weigh 400 g straw particles, put the straw particles into the electroplating wastewater, stir and mix for 30 min; take 10 L seawater, add 2000 g red mud into the seawater, stir and mix for 20 min, adjust a value to 8.5, filter after standing for 2 h, and obtain a filtrate; ultrasonically mix a mixture of the straw particles and the electroplating wastewater, with the filtrate for 30 min, stand for 3 h, and then ultrasonically mix for 20 min, filter after standing for 1 h, and adjust a pH value to 7.

The Second Embodiment

Take 10 L electroplating wastewater for stand-by, crush straws into particles having a particle size of 80 meshes and weigh 500 g straw particles, put the straw particles into the electroplating wastewater, stir and mix for 40 min; take 10 L seawater, add 3000 g red mud into the seawater, stir and mix for 20 min, adjust a value to 9, filter after standing for 2 h, and obtain a filtrate; ultrasonically mix a mixture of the straw particles and the electroplating wastewater, with the filtrate for 30 min, stand for 3 h, and then ultrasonically mix for 20 min, filter after standing for 1 h, and adjust a pH value to 7.

The Third Embodiment

Take 10 L electroplating wastewater for stand-by, crush straws into particles having a particle size of 100 meshes and weigh 500 g straw particles, put the straw particles into the electroplating wastewater, stir and mix for 40 min; take 10 L seawater, add 3000 g red mud into the seawater, stir and mix for 25 min, adjust a value to 9, filter after standing for 2.5 h, and obtain a filtrate; ultrasonically mix a mixture of the straw particles and the electroplating wastewater, with the filtrate for 40 min, stand for 3 h, and then ultrasonically mix for 25 min, filter after standing for 1.5 h, and adjust a pH value to 7.

The Fourth Embodiment

Take 10 L electroplating wastewater for stand-by, crush straws into particles having a particle size of 100 meshes and weigh 500 g straw particles, put the straw particles into the electroplating wastewater, stir and mix for 50 min; take 10 L seawater, add 3000 g red mud into the seawater, stir and mix for 30 min, adjust a value to 9.5, filter after standing for 3 h, and obtain a filtrate; ultrasonically mix a mixture of the straw particles and the electroplating wastewater, with the filtrate for 50 min, stand for 3 h, and then ultrasonically mix for 30 min, filter after standing for 2 h, and adjust a pH value to 7.

The Fifth Embodiment

Take 10 L electroplating wastewater for stand-by, crush straws into particles having a particle size of 60 meshes and weigh 500 g straw particles, heat the crushed straw particles at 250° C. in vacuum condition for 1.5 h, obtain carbonized straw particles, put the carbonized straw particles into the electroplating wastewater, stir and mix for 50 min; take 10 L seawater, add 3000 g red mud into the seawater, stir and mix for 30 min, adjust a value to 9.5, filter after standing for 3 h, and obtain a filtrate; ultrasonically mix a mixture of the carbonized straw particles and the electroplating wastewater, with the filtrate for 50 min, stand for 3 h, and then ultrasonically mix for 30 min, filter after standing for 2 h, and adjust a pH value to 7.

The Sixth Embodiment

Take 10 L electroplating wastewater for stand-by, crush straws into particles having a particle size of 100 meshes and weigh 500 g straw particles, heat the crushed straw particles at 300° C. in vacuum condition for 2 h, obtain carbonized straw particles, put the carbonized straw particles into the electroplating wastewater, stir and mix for 50 min; take 10 L seawater, add 3000 g red mud into the seawater, stir and mix for 30 min, adjust a value to 9.5, filter after standing for 3 h, and obtain a filtrate; ultrasonically mix a mixture of the carbonized straw particles and the electroplating wastewater, with the filtrate for 50 min, stand for 3 h, and then ultrasonically mix for 30 min, filter after standing for 2 h, and adjust a pH value to 7.

Concentrations of chromium ions, copper ions, nickel ions, cadmium ions, zinc ions and silver ions in the treated electroplating wastewater of the first embodiment to the sixth embodiment are tested and test results are compared with Electroplating Pollutant Discharge Standard (GB21900-2008). Accordingly, comparing results are shown in Table 1.

TABLE 1

| Project | $Cr^{6+}$ (mg/l) | $Cu^{2+}$ (mg/l) | $Zn^{2+}$ (mg/l) | $Ni^{2+}$ (mg/l) | $Ag^+$ (mg/l) | $Cd^{2+}$ (mg/l) |
|---|---|---|---|---|---|---|
| Wastewater Sample | 76 | 34 | 47 | 30 | 22 | 52 |
| First Embodiment | 0.191 | 0.483 | 1.428 | 0.458 | 0.282 | 0.048 |
| Second Embodiment | 0.180 | 0.460 | 1.401 | 0.431 | 0.268 | 0.046 |
| Third Embodiment | 0.167 | 0.442 | 1.377 | 0.407 | 0.244 | 0.044 |
| Fourth Embodiment | 0.159 | 0.424 | 1.354 | 0.387 | 0.226 | 0.038 |
| Fifth Embodiment | 0.132 | 0.321 | 1.232 | 0.275 | 0.123 | 0.026 |
| Sixth Embodiment | 0.121 | 0.357 | 1.112 | 0.242 | 0.101 | 0.025 |
| National Standard | ≤0.2 | ≤0.5 | ≤1.5 | ≤0.5 | ≤0.3 | ≤0.05 |

It can be seen from Table 1, the first embodiment to the sixth embodiment are in accordance with requirements of the Electroplating Pollutant Discharge Standard (GB21900-2008). Therefore, it shows that the present invention has good treatment effect, low cost, high efficiency and environmental protection, and is suitable for all small and medium enterprises including electroplating process to promote the application.

The above embodiments are merely illustrative of preferred embodiments of the present invention and are not intended to limit the scope of the present invention, and various modifications and variations of the technical solutions of the present invention, made by those skilled in the art without departing from the spirit of the present invention, shall be within the scope of protection as set forth in the claims of the present invention.

What is claimed is:

1. An electroplating wastewater treatment method, which adopts industrial waste red mud, agricultural waste straws and seawater to treat heavy metal ions in electroplating wastewater, the method comprising steps of:
   (A) mixing the straws with the electroplating wastewater, which comprises crushing the straws into particles, stirring and mixing the crushed straw particles with the electroplating wastewater for 30-50 min, and obtaining a mixture, wherein 40-50 g of straw particles are added into each liter of the electroplating wastewater;
   (B) mixing the seawater with the red mud, which comprises stirring and mixing the seawater with the red mud for 20-30 min, adjusting a pH value of a mixture of the seawater and the red mud in a range of 8.5-9.5, filtering after standing for 2-3 h, and obtaining a filtrate, wherein: a weight of the red mud which is added into the seawater is 200-300 g per liter seawater;
   (C) adsorbing metal ions, which comprises ultrasonically mixing the mixture in step (A) with the filtrate in step (B) for 30-50 min, standing for 3-5 h, and then ultrasonically mixing for 20-30 min, and then filtering after standing for 1-2 h, and obtaining a filtrate; and
   (D) adjusting a pH value of the filtrate obtained in step (C) to 7.

2. The electroplating wastewater treatment method, as recited in claim 1, wherein: in step (C), a volume ratio of the mixture obtained in step (A) and the filtrate obtained in step (B) is in a range of 1:0.8-1.2.

3. The electroplating wastewater treatment method, as recited in claim 1, wherein: in step (A), the crushed straw particles have a particle size in a range of 60-100 meshes.

4. The electroplating wastewater treatment method, as recited in claim 1, wherein: in step (A), before mixing the crushed straw particles with the electroplating wastewater, the crushed straw particles are heated at 250-350° C. for 1.5-3 h in vacuum condition.

5. The electroplating wastewater treatment method, as recited in claim 1, wherein: the electroplating wastewater comprises chromium-containing wastewater, copper-containing wastewater, nickel-containing wastewater, cadmium-containing wastewater, zinc-containing wastewater and silver-containing wastewater.

* * * * *